United States Patent

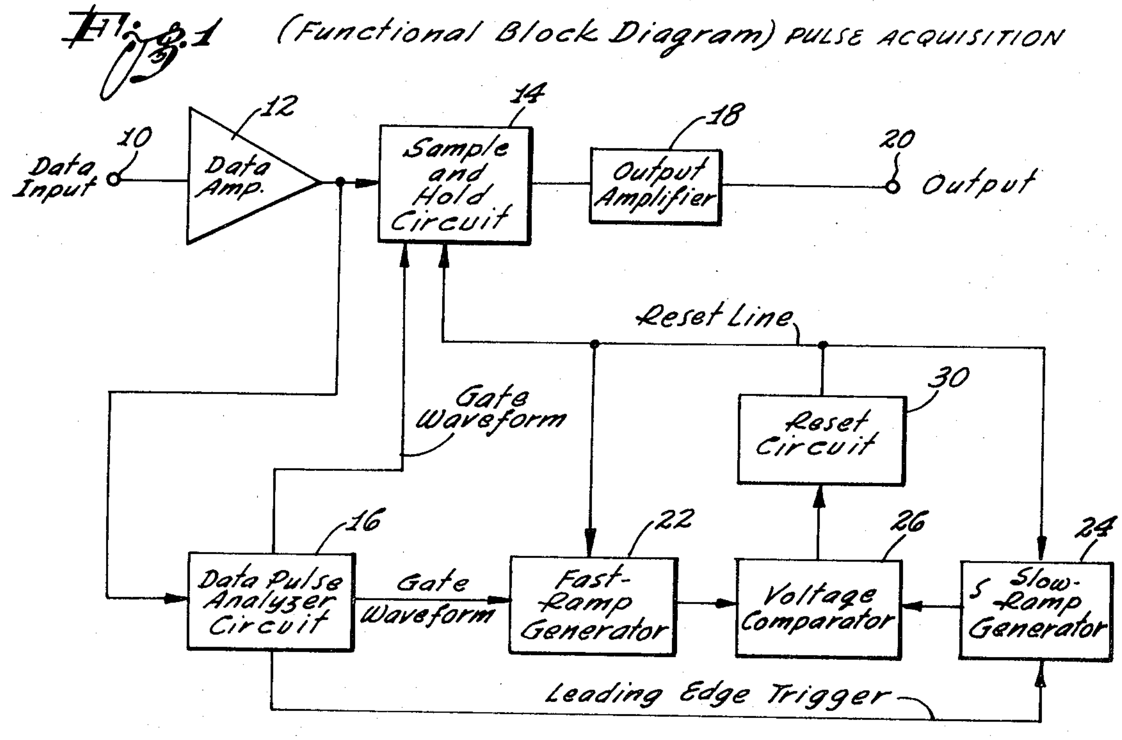
Fig. 1 (Functional Block Diagram) PULSE ACQUISITION
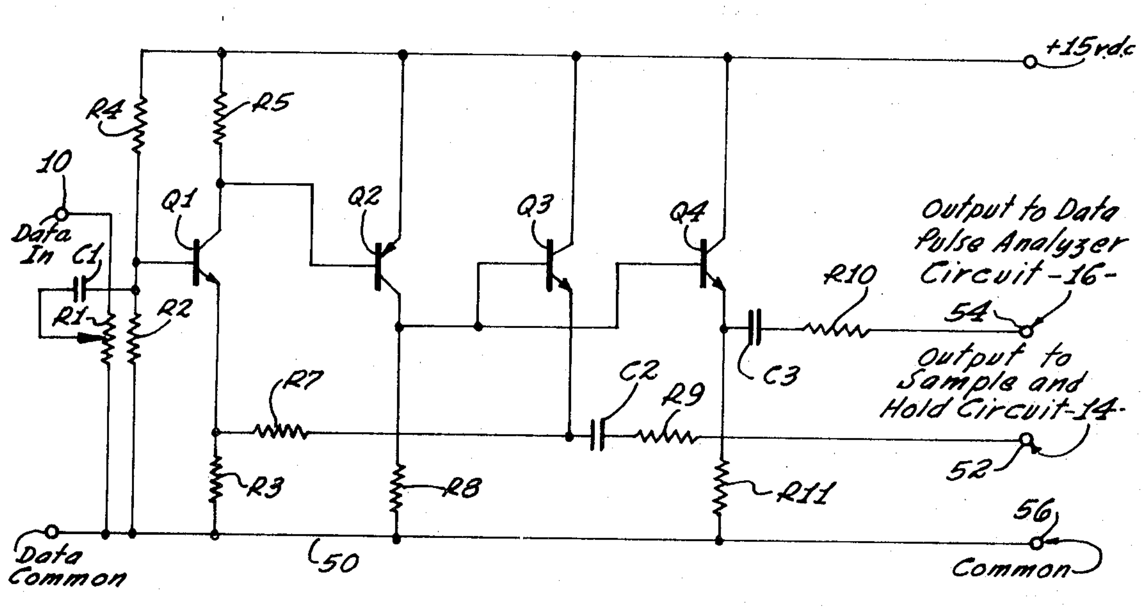
Fig. 2 (Data Amplifier -12-)
INVENTOR
Clyde J. Norton
Kemp and Beecher
By Warren T. Jessup
ATTORNEYS

Norton

[15] 3,659,211

[45] Apr. 25, 1972

[54] PULSE ACQUISITION SYSTEM FOR TRANSFORMING RECEIVED SHORT DURATION DATA PULSES INTO PULSES OF THE SAME AMPLITUDE BUT OF A LONGER DURATION

[72] Inventor: Clyde J. Norton, Van Nuys, Calif.

[73] Assignee: Astro-Science Corporation, El Monte, Calif.

[22] Filed: Sept. 14, 1970

[21] Appl. No.: 72,066

[52] U.S. Cl. ..............................328/151, 307/228, 307/235, 307/267, 328/58, 328/115

[51] Int. Cl. ......................................H03k 5/00, H03k 17/00

[58] Field of Search ....................307/235, 267, 228; 328/58, 328/115, 116, 151

[56] References Cited

UNITED STATES PATENTS 3,448,296 6/1969 Schwaninger..........................307/267

3,263,090 7/1966 Blocher, Jr. ...........................307/267

OTHER PUBLICATIONS

" Pulse Stretcher" by Fritz et al. in IBM Technical Disclosure Bulletin, vol 7, No. 6, November 1964, pages 548- 549.

" Stretching of Analogue Pulses" by Mundl in Electronic Engineering, Feb. 1969, pages 215, 216 & 217.

*Primary Examiner*—Stanley D. Miller, Jr.

*Attorney*—Jessup & Beecher

[57] ABSTRACT

A data pulse acquisition, storage and read-out system is described which is capable of measuring automatically the amplitude and duration of an input data pulse, and of generating a corresponding output pulse of similar amplitude but of greater duration. A primary function of the system to be described is to translate selected parameters of wide-band, short duration data input pulses, and effectively to reconstitute such pulses into a more suitable format for storage purposes. The stored pulses may subsequently be re-formed by similar circuitry into a facsimile of the original data input pulses.

4 Claims, 7 Drawing Figures

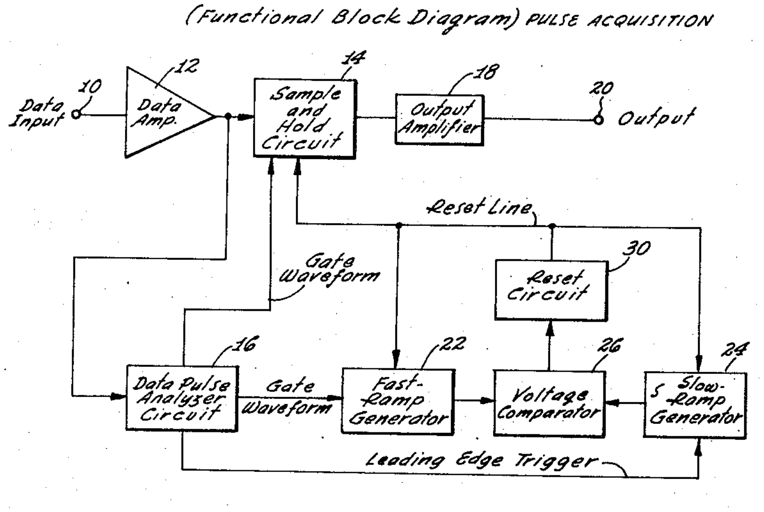

Fig. 3 (Sample and Hold Circuit -14-)
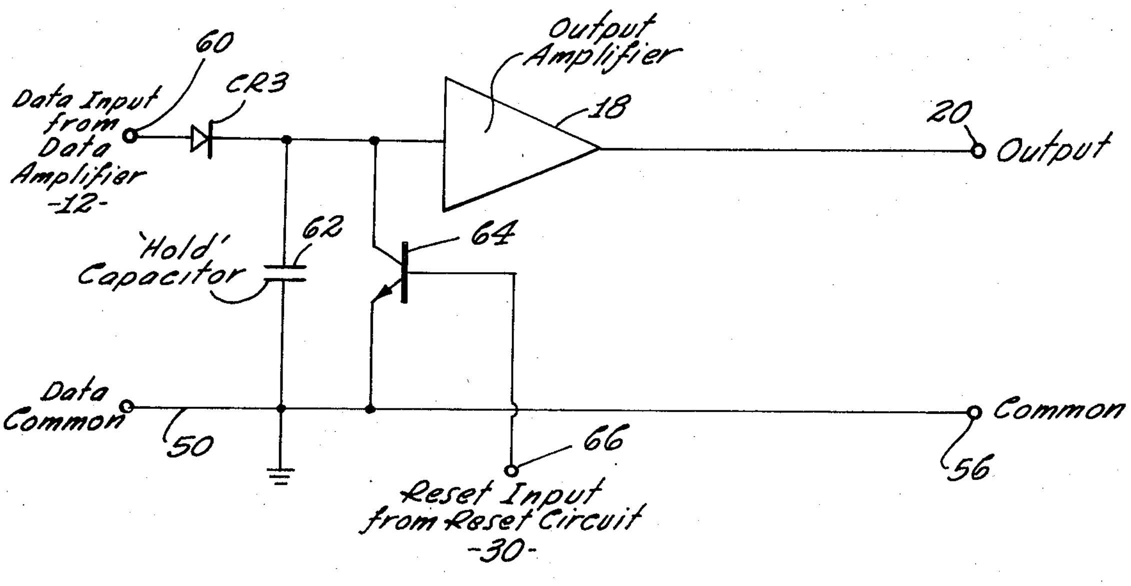
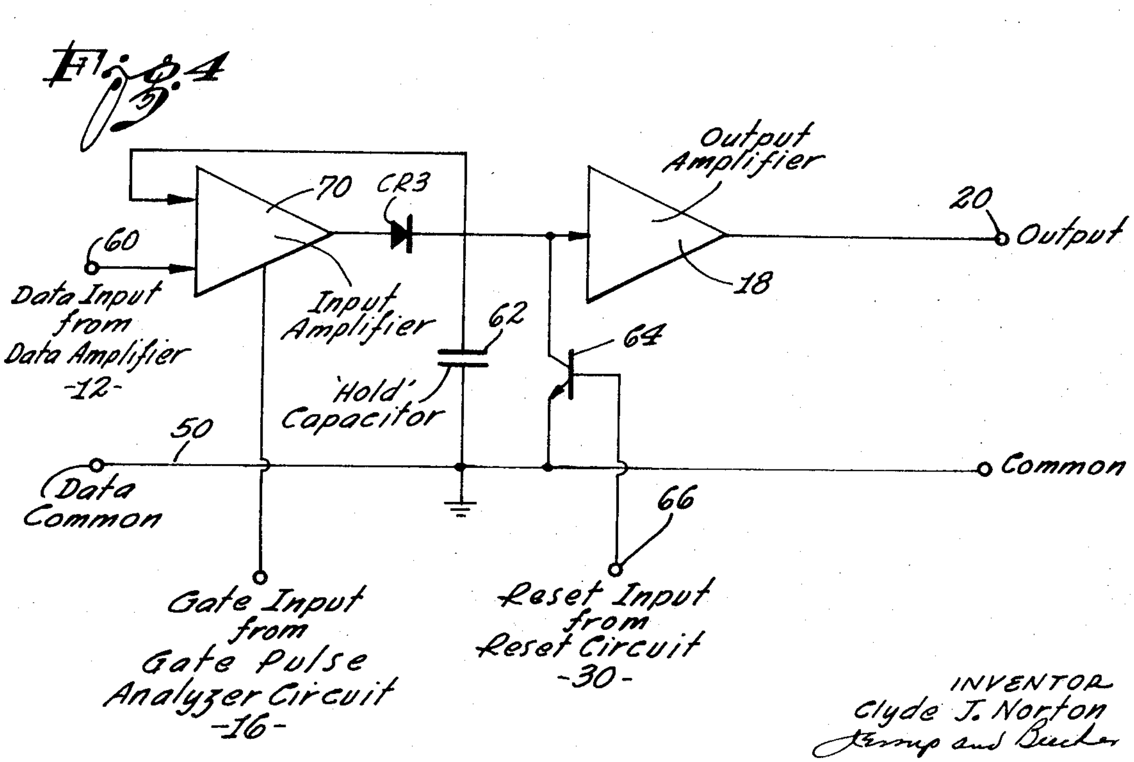
Fig. 4
INVENTOR
Clyde J. Norton
Jessup and Beecher
By Warren T. Jessup
ATTORNEYS PATENTED APR 25 1972 3,659,211
SHEET 3 OF 4
Fig. 5 (Data Pulse Analyzer -16-)
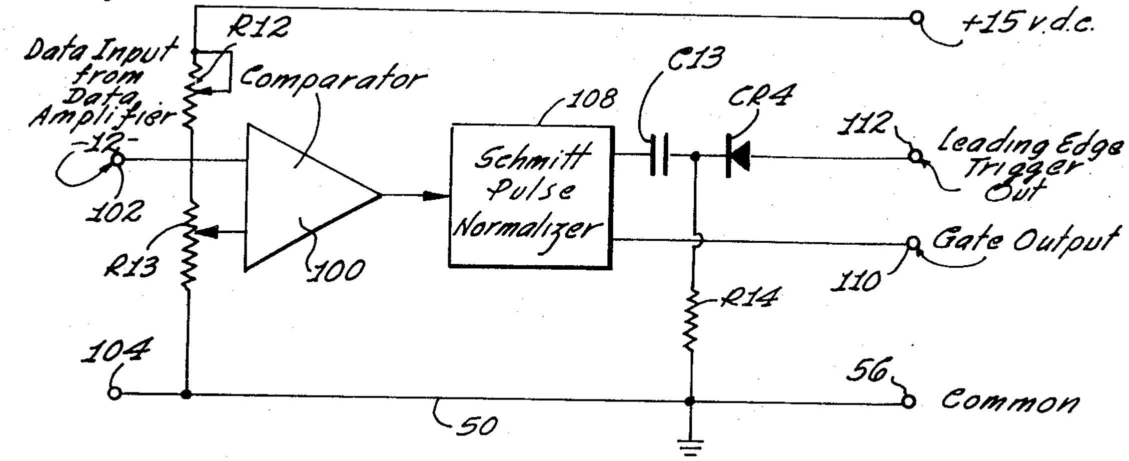
Fig. 6 (Fast Ramp Generator -22-)
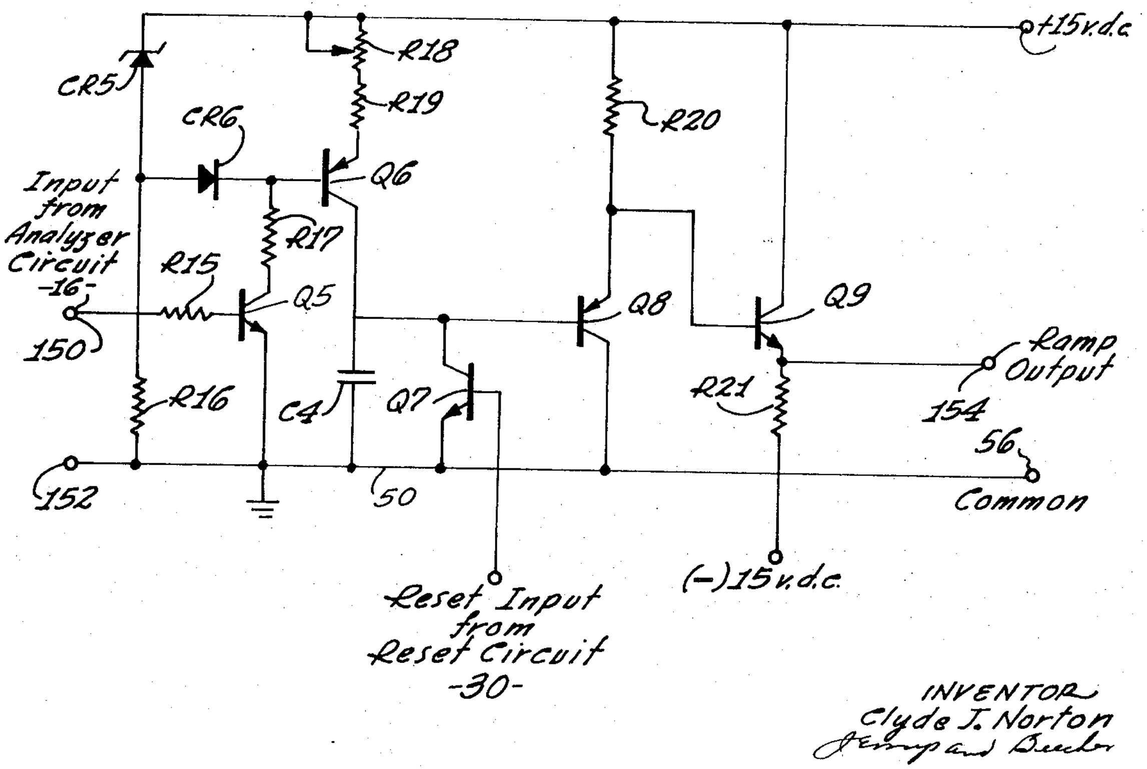
INVENTOR
Clyde T. Norton
Jessup and Beecher
By Warren T. Jessup
ATTORNEYS (Functional Block Diagram) PULSE RETRIEVAL INVENTOR
Clyde J. Norton
Jessup and Beecher
By Warren T. Jessup
ATTORNEYS

A PULSE ACQUISITION SYSTEM FOR TRANSFORMING RECEIVED SHORT DURATION DATA PULSES INTO PULSES OF THE SAME AMPLITUDE BUT OF A LONGER DURATION

BACKGROUND OF THE INVENTION

The concept of the present invention is predicated upon the division of wide-band, short duration data input pulses into amplitude and time increments, and of then creating output pulses having similar amplitude levels but of much longer pulse durations. The effective multiplication of the data pulse durations achieved by the system of the invention permits the input data to be recorded, for example, by a relatively narrow bandwidth, slow speed magnetic tape recorder.

The pulse width of the individual pulses synthesized by the system of the invention is related to the pulse width of the corresponding input pulses by a predetermined factor. This factor is established by the bandwidth of the aforesaid magnetic tape recorder and by the range of pulse widths expected in the input data. The reconstituted pulse data is stored by the system of the invention with the same pulse repetition frequency as that of the input data; this being accomplished by using the leading edge of each input data pulse to initiate the start of the corresponding reconstituted pulses. The accuracy of the pulse repetition frequency of the reconstituted pulses therefore depends only upon the tape speed accuracy of the magnetic tape recorder.

The system of the invention, therefore, synthesizes a generated pulse having a known time relationship with a corresponding input data pulse, and records the synthesized pulse in the normally unused space between sequential input data pulses. That is, the space between each sequential input data pulse is used in exchange for the bandwidth which would otherwise be required to record the data pulses. It is evident that in the system of the invention that for any one pulse train (data) which exhibits regularly recurring unused time intervals, such time intervals are utilized by the system to insert the expanded pulses synthesized in the system without loss of any pulse. Mixed pulse trains can be processed where loss of a pulse is not of consequence in the evaluation of the data being processed.

BRIEF DESCRIPTION OF THE DRAWINGS

FIG. 1 is a functional block diagram of one embodiment of the invention whereby input data pulses may be reconstituted in the manner described above;

FIG. 2 is a circuit diagram of a data amplifier included in the system of FIG. 1;

FIG. 4 is a circuit diagram of a further type of sample and hold circuit which may be included in the system of FIG. 1;

FIG. 5 is a simplified schematic of a data pulse analyzer circuit which is included in the system of FIG. 1;

FIG. 6 is a circuit diagram of a ramp generator suitable for use in the system of FIG. 1; and FIG. 7 is a block diagram of a system, similar to the system of FIG. 1, and which is useful in reconstituting the original input data pulses from the synthesized pulses recorded by the system of the invention.

DETAILED DESCRIPTION OF THE ILLUSTRATED EMBODIMENTS

Figure 3:
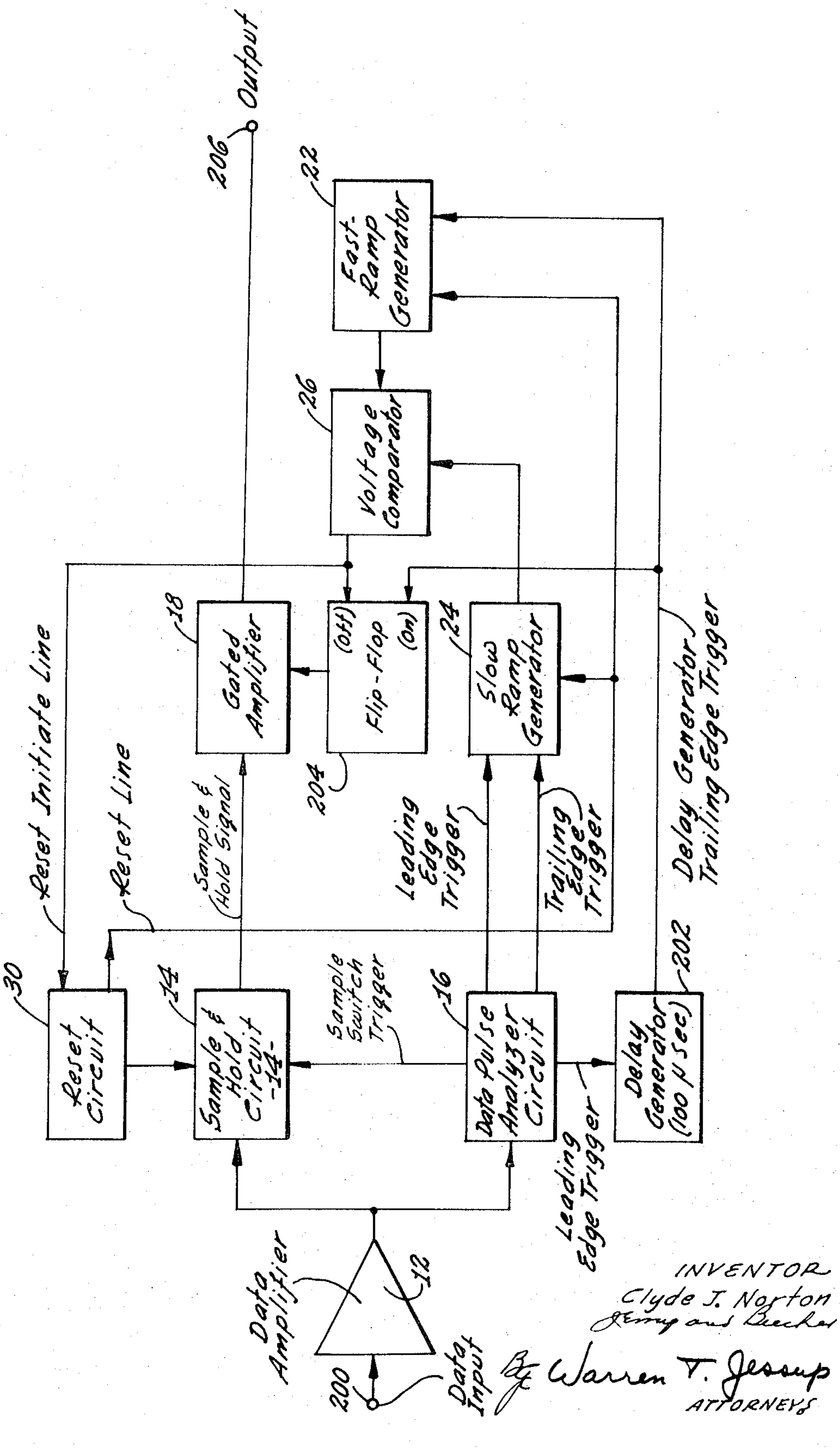
FIG. 3 is a circuit diagram of a sample and hold circuit which also is included in the system of FIG. 1.

The system shown in FIG. 1, for example, includes an input terminal 10 to which the input data pulses are introduced. The terminal 10 is connected to a data amplifier 12 which, in turn, is connected to a sample and hold circuit 14 and to a data pulse analyzer circuit 16. The data pulse analyzer circuit generates a gate waveform to the sample and hold circuit. The sample and hold circuit is also connected to an output amplifier 18 which, in turn, is connected to an output terminal 20. The reconstituted pulses appear at the output terminal 20, and may be recorded by any suitable low bandwidth, low speed tape recorder (not shown).

The data pulse analyzer circuit 16 also provides a gate waveform to a ramp generator 22 which may be identified as a fast, acquisition ramp generator, and the data pulse analyzer circuit supplies a leading edge trigger pulse to a second ramp generator 24 which may be termed a slow read-out ramp generator. The outputs from the two ramp generators 22 and 24 are compared in a voltage comparator circuit 26 of any known and suitable construction, and the output from the voltage comparator is applied to any known type of reset circuit 30. The reset circuit provides reset signals for the sample and hold circuit 14, for the ramp generator 22, and for the ramp generator 24.

Each data input pulse is amplified to a suitable level by the data amplifier 12. As mentioned above, the data amplifier drives the sample and hold circuit 14, which includes a storage capacitor that is charged to the voltage level of the data pulse, and it also drives the data pulse analyzer circuit 16 which provides a trigger pulse output coincident with the leading edge of the data pulse, and which also provides gating waveforms equal in duration to the data pulse.

In addition to producing appropriate outputs in response to the introduction of the aforesaid data pulse, the data pulse analyzer circuit 16 also incorporates a threshold sensitivity adjustment. If the received data pulse does not exceed the preset threshold level, the system does not respond, so that the system is made relatively immune to false operation due to background noise voltages.

The gated waveforms produced by the data pulse analyzer circuit 18 when a valid data pulse is received serve to set the sample and hold circuit 14, thereby allowing the output of the data amplifier !12 to charge the aforesaid storage capacitor in the sample and hold circuit. The aforesaid gated wavefrom from the data pulse analyzer circuit 16 also serves to operate the fast ramp generator 22, causing the capacitor included therein to charge linearly until the input data pulse terminates.

The voltage developed across the capacitor in the sample and hold circuit 14 is amplified by the output amplifier 18, and that voltage becomes the reconstituted output pulse. The voltage achieved by the fast ramp generator 22 provides one input to the voltage comparator circuit 26, and the slow ramp generator 24 provides a second input to the voltage comparator circuit. The operation of the slow ramp generator 24 is started by the leading edge trigger pulse from the data pulse analyzer circuit 16.

When the relatively slowly rising voltage from the slow ramp generator 24 equals the voltage previously attained by the fast ramp generator 22, an output signal is developed by the voltage comparator 26, and this output voltage operates the reset circuit 30. The output of the reset circuit 30 drives suitable switching circuits which discharge the capacitors in the ramp generators 22 and 24, and in the sample and hold circuit 14. This action terminates the output pulse, and also resets the system for the next data pulse.

It will be appreciated that the degree of pulse expansion produced by the system of FIG. 1 is determined by the ratio of the slow ramp rise time to the fast ramp rise time, and the system can be designed, for example, to provide a pulse width expansion factor ranging from several to several hundred.

The following parameters are given as a suggested specification for a typical constructed system, and are not intended to be in any way limiting on the actual concept of the invention.

The input impedance should not be less than 1,000 ohms resistive shunted by not more than 15 pf capacitance. Provision should be incorporated for terminating a coaxial input line with a suitable resistive load. At maximum gain setting, the system should be able to accommodate pulse voltage levels of from 0.1 to 3.0 volts peak. A multi-turn potentiometer capable of providing at least 20 db gain adjustment range should be included. The aforesaid potentiometer may take the form of an input trimming potentiometer capable of accepting a signal level of at least 30 volts peak without exceeding its performance ratings.

The system should respond to data pulse durations ranging from 0.1 microseconds or less to 30 microseconds, although other ranges may be specified as required. A further trimming potentiometer should be provided which allows adjustments of the trigger threshold level from 50 millivolts to 0.5 volts, in order to permit adjustment of the system for optimum performance with various noise levels present on the input data line.

The output impedance should be of the order of 600 ohms ±10 percent. The output circuits should be capable of producing a maximum voltage level of at least 5.0 volts across a 600 ohm load resistor. A trimming potentiometer capable of varying the output voltage from zero to maximum should be provided. The output pulse width should be a minimum of 30 microseconds and a maximum of 330 microseconds.

The transfer characteristics in the time domain should be such that the output pulse width may be expressed as a linear multiple of the input pulse width added to a fixed minimum pulse width of, for example, 30 microseconds. Temperature stability of the transfer characteristics should be such that the output pulse duration will change by not more than ±5 percent as the ambient temperature is varied over a range of −10° C to +71° C.

The data amplifier 12 of FIG. 1 is shown in circuit detail in FIG. 2. The primary function of the data amplifier is the linear scaling of the input data to a level suitable for further processing. Two outputs are required from the data amplifier, the first being used to charge a capacitor in the sample and hold circuit 14, and the second being introduced to the data pulse analyzer circuit 16 where the data pulse duration is measured.

Both pulse outputs from the data amplifier 12 require fast rise and fall times and low output impedance, as well as good phase fidelity. These requirements are facilitated to some degree by the fact that high gain is not required in the data amplifier 12, it being estimated that a gain of 6 db, for example, will be adequate to meet most usual requirements. Pulse rise and fall times of the order of 25 nanoseconds will be required in order to avoid excessive degradation of a minimum data pulse width of 100 nanoseconds. This may be accomplished by using a gain stage employing transistors having a high $F_t$ and with high feedback.

The schematic circuit diagram of a suitable data amplifier is shown in FIG. 2. The illustrated circuit includes a PNP transistor Q2 which may be of the type presently designated 2N3251, and three NPN transistors Q1, Q3 and Q4, each of which may be of the type presently designated 2N3227. The input terminal 10 is connected to a 1 kilo-ohm potentiometer R1, whose other terminal is connected to a common or grounded lead 50, and whose movable contact is connected to a coupling capacitor C1 of, for example, 0.1 microfarads.

The coupling capacitor C1 is connected to the base of the transistor Q1, as is the junction of a pair of biasing resistors R2 and R4, the resistors being connected between the positive terminal of, for example, a 15-volt DC source and the common lead 50. The resistors R2 and R4 may have respective resistances of 22 kiloohms and 82 kilo-ohms. The collector of the transistor Q1 is connected to the base of the transistor Q2 and to a 1 kilo-ohm resistor R5. The emitter of the transistor Q1 is connected to a 270 ohm feedback resistor R7 and to a grounded 270 ohm resistor R3. The resistor R5 is connected to the positive terminal of the 15-volt source, as is the emitter of the transistor Q2, and the collectors of the transistors Q3 and Q4.

The collector of the transistor Q2 is connected to a grounded 1 kilo-ohm resistor R8, and the emitter of the transistor Q4 is connected to a grounded 510 ohm resistor R11. The collector of the transistor Q2 is connected to the bases of the transistors Q3 and Q4. The emitter of the transistor Q3 is connected to the junction of the resistor R7 and a 0.1 microfarad coupling capacitor C2. The capacitor C2 is connected to a 47 ohm resistor R9 which, in turn, is connected to an output terminal 52 providing an output for the sample and hold circuit 14. The emitter of the transistor Q4 is connected to a 0.1 microfarad coupler capacitor C3 which, in turn, is connected through a 47 ohm resistor R10 to an output terminal 54 at which the output for the data pulse analyzer circuit 16 is provided. The ground or common lead 50 is connected to an output terminal 56 which provides a common connection to the other circuits.

The overall gain in the amplifier circuit of FIG. 2 using the constants described above is of the order of 6 db. This gain can be increased to 10 db, for example, by changing the feedback resistor R7 from 270 ohms to 560 ohms. A greater gain increase could also be achieved by changing the transistor operating levels. The input resistance to the amplifier of FIG. 2 is established by the 1 kilo-ohm gain potentiometer shunted by the bias resistor R2 for the input transistor Q1. The output resistance of the circuit is determined almost entirely by the 47 ohm resistors R9 and R10 in series with the output terminals. These resistors are included to reduce the amplifier instability caused by unfavorable loading.

The sample and hold circuit 14 is shown in one embodiment in FIG. 3 as comprising a diode CR 3 connected in series with an input terminal 60 and a capacitor 62 shunted between the diode and ground. An NPN transistor 64 is also provided which responds to the reset input derived from the reset circuit 30 and which is applied to the base of the transistor by way of an input terminal 66. As described above, the sample and hold circuit 14 accepts the input data pulse from the data amplifier 12, and charges the "hold" capacitor 62 to the maximum voltage level achieved during the data pulse.

Any reduction in the voltage from the data pulse is inhibited from discharging the capacitor 62 by means of the series diode CR 3. The diode CR 3 should be a highly efficient diode which ideally has 0 voltage drop in the forward direction and exhibits infinite resistance in the reverse or blocking directions. Normal silicon diodes have an adequately great reverse resistance. However, the forward drop of approximately 0.6 volts of the usual silicon diode must be overcome before perfect conduction can commence. If the diode CR 3 fulfills the requirement of 0 forward voltage drop and infinite reverse resistance, then the voltage developed across the "hold" capacitor 62 is always proportional to the magnitude of the data pulse. At the conclusion of the data pulse the drop in the input voltage level would immediately reverse-bias the diode, leaving the capacitor charged to the peak value established during the data pulse. At the end of the operation, the capacitor 62 is discharged by the reset signal from the reset circuit 30 of FIG. 1 which signal switches on the transistor 64 essentially to form a short circuit across the capacitor.

The ideal requirements for the diode CR 3 to exhibit a zero forward voltage drop and an infinite reverse resistance may be simulated by the circuit of FIG. 4, in which a high gain amplifier 70 is included in the circuit. The high gain amplifier 70 is set up in a unity gain feedback configuration in such a manner that the silicon high speed diode CR 3 is included in the feedback loop.

A very small signal on the non-inverting input line, for example, of 1 millivolt or less, will cause the amplifier output to increase sufficiently to bias the diode CR 3 immediately to conduction. Once conduction occurs, the 100 percent resulting feedback forces the amplifier to unity gain providing an output which very precisely follows the input. At the conclusion of the data input pulse, a reduction in the input level is amplified by the input amplifier 70 causing a rapid reduction in the output voltage so that the diode CR 3 is immediately reverse-biased. The illustrated systems allows the capacitor 62 to hold the charge acquired during the duration of the input pulse until the capacitor is discharged by the operation of the reset circuit 30.

The net operational effect of the circuit of FIG. 4 is to divide the voltage drop of the diode CR 3 by the gain of the amplifier 70. An amplifier gain of only 100 is sufficient to reduce the effective forward drop of the circuit to less than 10 millivolts. The amplifier 70 is constructed to incorporate a gating capability in order to block the data signal from the "hold" capacitor until the data pulse analyzer circuit 16 provides a gate signal.

The voltage appearing across the "hold" capacitor 62 is amplified by the output amplifier 18 which provides the data output voltage at the output terminal 20. The primary function of the output amplifier 18 is to present an extremely high impedance to the "hold" capacitor 62 in order to avoid discharging or otherwise affecting the voltage of the capacitor. In addition, the output amplifier 18 provides a low impedance drive capability suitable for operating a variety of loads without exhibiting a significant sensitivity to load changes. The voltage gain of the output amplifier should be approximately unity.

The data pulse analyzer 16 serves the dual function of threshold detection and of furnishing an output trigger and gating waveform for operating other circuits. A simplified circuit diagram for the data pulse analyzer shown in FIG. 5. A voltage comparator 100 is biased by a potentiometer R13 so that its output is normally positive. Data input from the data amplifier 12 is applied across input terminals 102 and 104, the terminal 102 being connected to the input of the comparator 100, and the terminal 104 being connected to the common or grounded lead 50. The potentiometer R13 and a further potentiometer R12 are connected between the positive terminal of the 15-volt direct current source and ground. The comparator 100 may be a high speed integrated circuit voltage comparator of the type designated mua 710. The positive output normally developed by the comparator 100 holds an associated Schmitt pulse normalizer 108 in a predetermined conduction status.

Upon the receipt of a data pulse from the data amplifier 12 having a voltage great enough to overcome the bias set by the potentiometer R13, the output of the comparator 100 abruptly goes negative, reversing the conductive status of the Schmitt pulse normalizer 108 is essentially a voltage sensitive bistable multivibrator having a very fast switching time, and such circuits are per se well known to the art.

Complemented outputs are taken from the Schmitt pulse normalizer 108, one of which is applied directly to an output terminal 110 as a gate waveform, and the other is differentiated by a capacitor C13 and grounded resistor R14 and passed through a diode CR4 to a further output terminal 112 where it provides a trigger signal corresponding to the leading edge of the data input pulse. That is, the output applied to the output terminal 112 is differentiated and rectified to provide a negative trigger pulse for initiating the operation of the slow ramp generator 24. The positive-going differentiated pulse from the differentiating circuit C13, R14 is prevented from reaching the output terminal 112 by the diode CR4. The gate waveform applied to the gate output terminal 110 is essentially a pulse whose duration is approximately equal to that of the data pulse, but its amplitude is a predetermined fixed value. The latter gate waveform pulses control the sample and hold circuit 14 and the fast ramp generator 22.

The basic circuit for both the fast ramp generator 22 and the slow ramp generator 24 is shown in FIG. 6. With minor modifications the basic circuit shown in FIG. 6 will serve for both the fast ramp generator 22 and the slow ramp generator 24, although the circuit is illustrated as appropriate for the fast ramp generator 22.

The input received from the analyzer circuit 16 is applied across a pair of input terminals 150 and 152. The terminal 152 is connected to the common or ground lead 50, and the input terminal 150 is connected through a resistor R15 to the base of an NPN transistor Q5 having a grounded emitter. The collector of the transistor Q5 is connected through a resistor R17 to a diode CR6 and to the base of a PNP transistor Q6. The diode CR6 is connected to the junction of a Zener diode CR5 and a grounded resistor R16. The Zener diode is connected to the positive terminal of the 15-volt direct current source, and the emitter of the transistor Q6 is connected to that terminal through a resistor R19 and a potentiometer R18. The collector of the transistor Q6 is connected to a grounded capacitor C4 and to the collector of a resetting switching transistor Q7, the emitter of which is grounded. The transistor Q7 is an NPN transistor.

The reset input from the reset circuit 30 is applied to its base, and its collector is connected to the base of the transistor Q8. The transistor Q8 is a PNP transistor. It has a grounded collector, and its emitter is connected to the base of the transistor Q9 and through a resistor R20 to the positive terminal of the 15-volt direct voltage source. The transistor Q9 is an NPN transistor. Its collector is connected to the aforesaid positive terminal, and its emitter is connected through a resistor R21 to the negative terminal of the aforesaid DC source. The ramp output is developed at an output terminal 154 connected to the emitter of the transistor Q9.

A gate waveform from the data pulse analyzer is applied to the input terminal 150 through the current limiting resistor R15 to the base of the transistor Q5. The transistor Q5 is rendered fully conductive and is driven to its saturation state. The transistor Q5 clamps the base of the transistor Q6 to a reference voltage, established by the Zener diode CR5 and silicon diode CR6. The collector of the transistor Q6 provides a fixed current charging source for the capacitor C4, causing a linear ramp of voltage to develop across the capacitor.

The precise value of the charging current, and thus the slope of the voltage ramp across the capacitor C4, is adjustable by adjusting the value of the potentiometer R18. The voltage ramp across the capacitor C4 is isolated from output loading by the transistors Q8 and Q9 which are connected as emitter followers. The provision of a PNP transistor for the transistor Q8 followed by an NPN transistor for the transistor Q9 cancels the emitter-base offset voltage normally developed by the individual transistors, and also provides a very high impedance load for the capacitor C4.

It should be noted that the termination of the input pulse applied to the inputer terminal 150 does not discharge the capacitor C4. The capacitor C4 holds its voltage until the end of the read-out cycle. At that time, the reset pulse applied to the base of the transistor Q7 drives the transistor Q7 to its saturation state, thereby discharging the capacitor C4 in preparation for the next data processing cycle.

The voltage comparator circuit 26 of FIG. 1 may, like the comparator 100 of FIG. 5, be a "mua 710" integrated circuit which is commercially available, and which need not be shown in circuit detail. As mentioned above, one input to the voltage comparator 26 is provided by the output of the fast ramp generator 22, and this voltage is a measure of the input pulse duration. The other input comes from the slow ramp generator 24, and when the two ramp output voltages become equal, the voltage comparator 26 develops an output signal, which activates the reset circuit 30 and terminates the output pulse.

It will be appreciated that the ratio of the output pulse width to the input pulse width is proportional to the ratio of the slopes of the ramp signals from the two ramp generators 22 an 24, as modified by any offsets which may have been introduced into the design.

The reset circuit 30 may be a one-shot integrated circuit multivibrator. The multivibrator will be triggered by the output of the voltage comparator, and its "on" period may be made sufficiently long reliably to discharge all the timing capacitors through suitably placed switching transistors. Since the reset circuit 30 operates only at the conclusion of a relatively slow read-out cycle, adequate time is available for performing the function with little interference with the data processing cycle.

As previously pointed out, the output pulses derived from the output terminal 20 (FIG. 1) may be recorded by a relatively slow tape recorder having a relatively narrow pass-band. The synthesized data pulse signals may therefore be stored by the tape recorder until subsequently required. When required, the stored pulses may be reconstituted into facsimiles of the original data pulse signals by means, for example, of the system shown in FIG. 7. As mentioned above, the system of FIG. 7 is similar to the system of FIG. 1 and, for that reason, like components have been designated by the same numbers. In the system of FIG. 7, data input from the recorder is applied to the input terminal 200 which is connected to a data amplifier 12.

As mentioned above, the system of FIG. 7 accepts data previously recorded using the system, for example, of FIG 1, and re-formats the data to a facsimile of the original input. As also mentioned, operation of the read-out system of FIG. 7 is very similar to that of the system of FIG. 1, but with the fast ramp generator and slow ramp generator functions interchanged. A major difference between the two systems lies in the addition of a 100 microsecond delay generator 202 which may, for example, take the form of a one-shot multivibrator.

Inasmuch as the real time reference of all the recorded data pulses is established in the system of FIG. 1 by the leading edge of each recorded pulse, some means for preserving this time reference must be incorporated into the read-out system of FIG. 7. The 100 microsecond time delay generator 202 serves this function.

The data pulse as reproduced by the tape recorder (not shown) are amplified to a suitable level by the data amplifier 12. As before, the output of the data amplifier drives both the sample and hold circuit 14 and data pulse analyzer circuit 16. The capacitor in the sample and hold circuit 14 is charged to the level of the recorded data pulse. The data pulse analyzer circuit develops an output trigger pulse at the leading edge of the data pulse, and it also provides a second output trigger at the trailing edge of the data pulse. These trigger pulses are present on separate output lines and are introduced to the slow ramp generator 24. The trigger pulse corresponding to the leading edge starts the timing cycle of the slow ramp generator, and it also fires the one-shot multivibrator incorporated into the delay generator 202. The trailing edge trigger pulse, on the other hand, terminates the charge cycle of the slow ramp generator 24. The voltage developed by the slow ramp generator is, therefore, a measure of the time duration of the recorded data pulse. This voltage is held until discharged by the reset circuit 30.

The delay generator 202 develops a trailing edge trigger pulse for example, 100 microseconds after it receives the leading edge trigger pulse, and the latter trailing edge trigger pulse is used to set a flip-flop 204 and to start the fast ramp generator 22. Operation of the flip-flop 204 actuates the gate in the output amplifier 18 which connects the sample and hold circuit 14 to the output terminal 206. Therefore, when the flip-flop 204 is set, the time of the leading edge for the output pulse is established, and the voltage achieved by the sample and hold capacitor in the sample and hold circuit 14 sets the amplitude level for the output pulse.

The voltage ramp developed by the fast ramp generator 22 after being triggered by the trailing edge trigger from the delay generator 202 serves as a second input for the voltage comparator 26, the output from the slow ramp generator 24 forming the first input. When the ramp from the fast ramp generator reaches a voltage equal to that previously developed by the slow ramp generator, an output signal is developed by the voltage comparator. This latter output signal resets the flip-flop 204, thus terminating the output pulse, and it triggers the reset circuit 30 to discharge the capacitors in the ramp generator and in the sample and hold circuit 14. The reset operation terminates the pulse processing cycle, and it prepares the system of FIG. 7 to accept and process the next pulse.

It should be noted that the maximum repetition frequency which can be accommodated by the system described above is usually somewhat less than 10,000 distinctly separate data pulses per second, with a minimum of dead time of somewhat greater than 100 microseconds between each of the data pulses.

The invention provides, therefore, an improved system whereby certain parameters of input data pulses are selected, to reconstitute the data pulse and to enable them to be stored, for example, in relatively low speed and narrow pass-band recorders, and to be subsequently reconstituted when required, by relatively simple and readily available electronic components and circuitry.

While a particular embodiment of the invention has been shown and described, modifications may be made, and it is intended in the following claims to cover all such modifications which fall within the spirit and scope of the invention.

What is claimed is:

1. A pulse acquisition system for receiving and processing wide-band, short duration data pulses, said system including:
   - input circuit means for receiving each of said data pulses;
   - sample and hold circuit means coupled to said input circuit means for developing a voltage corresponding to the amplitude of each received data pulse;
   - output circuit means coupled to said sample and hold circuit means for receiving a pulse signal therefrom corresponding in amplitude to the aforesaid voltage;
   - gate circuit means included in circuit with said sample and hold circuit means for determining the duration of said pulse signal received by said output circuit means; and
   - data pulse analyzer circuit means coupled to said input circuit means and timing circuit means coupled to said data pulse analyzer circuit means for applying a gate signal of a predetermined duration to said gate circuit means to establish the aforesaid duration of said pulse signal received by said output circuit means, said data pulse analyzer circuit means including circuitry for producing the leading edge of said gate signal corresponding in time to the leading edge of a received data pulse, and said timing circuit means including further circuitry for establishing the trailing edge of said gate signal with a timing related to the duration of the received data pulse by a predetermined factor.

2. The pulse acquisition system defined in claim 1, in which said further circuitry includes a first generator for producing a voltage having an amplitude related to the duration of the received data pulse, and a second generator for producing a ramp signal; and a voltage comparator circuit for producing a signal corresponding to the aforesaid trailing edge of said gate signal when the voltage of said ramp signal from said second generator equals the voltage developed by said first generator.

3. The system defined in claim 1, in which said further circuitry includes a circuit for producing a gate signal having a duration corresponding to the duration of the received data pulse, and for producing a trigger pulse corresponding in time to the leading edge of the received data pulse, a fast ramp generator coupled to said circuit for producing a ramp signal having an amplitude corresponding to the duration of said gate signal, a slow ramp generator coupled to said gate signal producing circuit and triggered by said trigger pulse; a voltage comparator circuit coupled to the outputs of said fast ramp generator and slow ramp generator for developing a further trigger pulse when the slow ramp signal reaches the amplitude of the fast ramp signal, and a reset circuit coupled to said further circuitry and responding to said trigger pulse from said voltage comparator circuit for establishing the trailing edge of said first-mentioned gate signal.

4. The pulse acquisition system defined in claim 1, in which said further circuitry comprises a delay generator coupled to the aforesaid circuitry for producing a trigger pulse having a predetermined time relation with said leading edge of said gate signal, and a ramp generator circuit responsive to said last-named trigger pulse.

* * * * *